United States Patent [19]

Mittal

[11] Patent Number: 5,141,589
[45] Date of Patent: Aug. 25, 1992

[54] VEHICULAR TIRE DUMP VALVE AND PRESSURIZATION SYSTEM

[75] Inventor: Chander P. Mittal, Rowland Heights, Calif.

[73] Assignee: Tire Inflation Systems Corp., Willoughby, Ohio

[21] Appl. No.: 366,857

[22] Filed: Jun. 14, 1989

Related U.S. Application Data

[60] Division of Ser. No. 245,704, Sep. 19, 1988, Pat. No. 4,862,938, which is a continuation-in-part of Ser. No. 943,068, Dec. 18, 1986, Pat. No. 4,782,878.

[51] Int. Cl.$^5$ .............................. B60C 23/00
[52] U.S. Cl. ...................... 152/415; 137/224
[58] Field of Search ............ 152/415, 417; 137/224, 137/226

[56] References Cited

U.S. PATENT DOCUMENTS

| | | | |
|---|---|---|---|
| 2,685,906 | 8/1954 | Williams | 152/417 |
| 2,693,841 | 11/1954 | Webster, Jr. | 152/417 |
| 2,989,999 | 6/1961 | Holbrook et al. | 152/416 |
| 3,099,309 | 7/1963 | Horta et al. | 152/416 |
| 4,619,303 | 10/1986 | Bryan et al. | 152/416 |
| 4,782,878 | 11/1988 | Mitall | 152/417 |
| 4,825,925 | 5/1989 | Schultz | 152/415 |

*Primary Examiner*—John J. Gallagher
*Assistant Examiner*—Francis J. Lorin
*Attorney, Agent, or Firm*—Body, Vickers & Daniels

[57] ABSTRACT

A system for inflating and deflating pneumatic tires of a vehicle through pneumatically actuated tire isolating valves is disclosed which isolates air under pressure in the tires from the system and which utilizes electronically controlled valves for achieving opening of the tire isolating valves and inflating, deflating or checking the pressure. The system is improved by incorporation of a dump valve at each tire which permits rapid deflation of the tire pressure upon demand. The dump valve is tire and system pressure responsive and is integrated into the system in a manner to be responsive to any number of deflated tire pressures. The dump valve comprises a movable piston with two positions wherein the piston is releasably held in the second position by a mechanical detent until a suitable pressure differential occurs across the axial surfaces of the piston to cause the piston to be released from the detent and to move back to the first position.

6 Claims, 5 Drawing Sheets

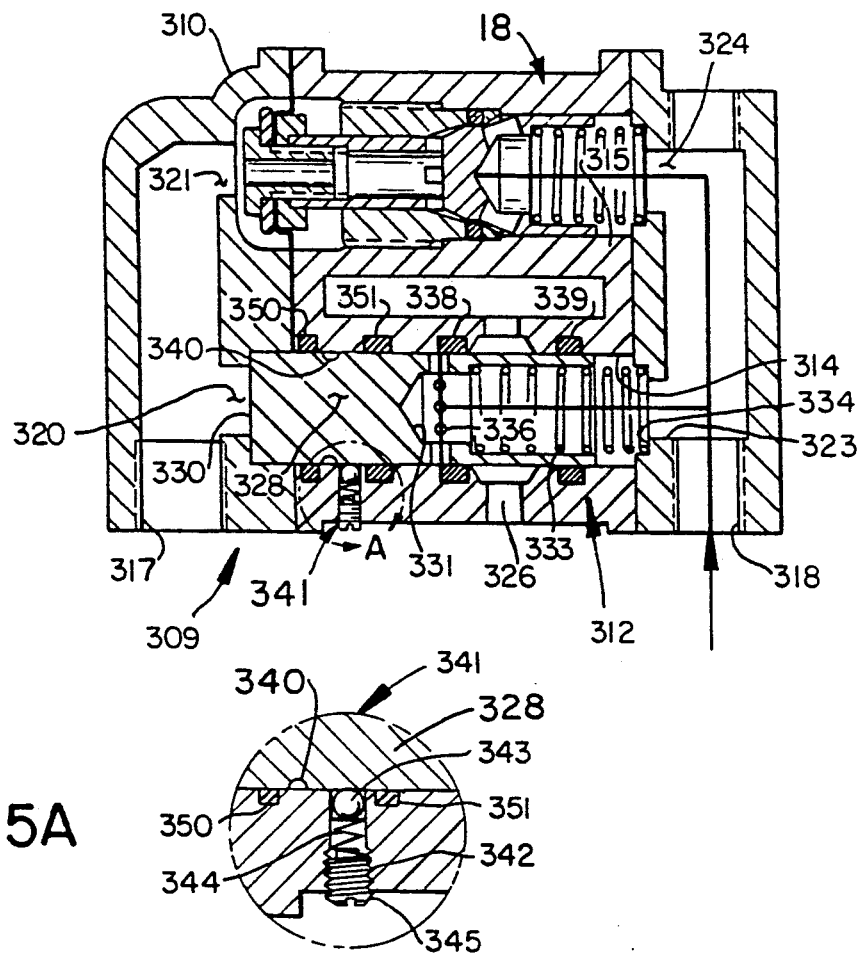
FIG. 5
FIG. 5A
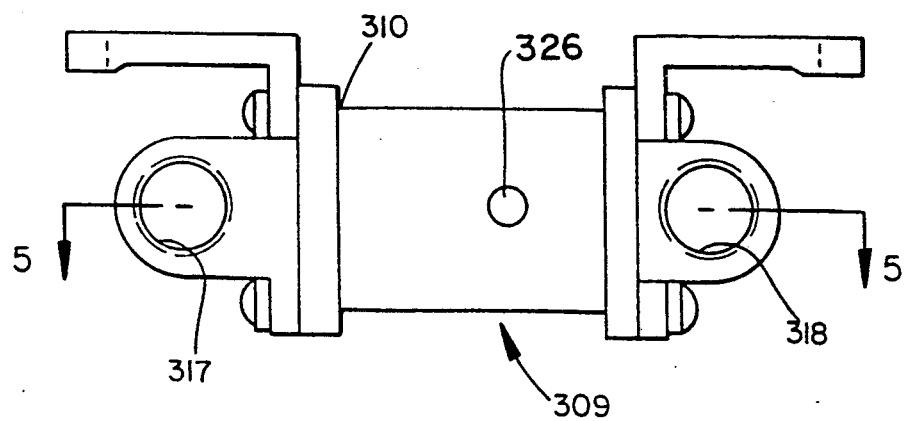
FIG. 4

VEHICULAR TIRE DUMP VALVE AND PRESSURIZATION SYSTEM

RELATED APPLICATIONS

This is a divisional application of my co-pending application Ser. No. 245,704, filed Sept. 19, 1988, now U.S. Pat. No. 4,862,938 and which application in turn is a continuation-in-part application of my prior patent application Ser. No. 943,068, filed Dec. 18, 1986, and entitled TIRE INFLATING AND DEFLATING SYSTEM AND APPARATUS which has now issued as U.S. Pat. No. 4,782,878.

INCORPORATION BY REFERENCE

Incorporated by reference herein is U.S. Pat. No. 2,989,999 to E.L. Holbrook et al. dated Jun. 27, 1961.

This invention relates generally to a vehicle tire pressure control system and more particularly to a quick dump valve for use in and in combination with such system.

While the invention is particularly adaptable for use in a vehicle tire pressure control system of the type disclosed in the parent patent (U.S. Pat. No. 4,782,878) the quick dump valve and system disclosed herein can be utilized in other types of vehicular tire pressure control systems, and may have application in other non-vehicular, fluid controlled systems such as may be encountered in the industrial sector.

BACKGROUND OF THE INVENTION

It is well known in the art to provide vehicles with on board systems for achieving inflating and/or deflating of vehicle tires and/or the checking of the pressure of air in the vehicle tires. The ability to selectively increase or decrease tire pressure is desirable in connection with optimizing operation of the vehicle under variable and changing conditions including, for example, weather, vehicle load, terrain and vehicle speed. Another advantage of such systems is their ability to isolate air under pressure in each vehicle tire from the remainder of the system so that any problem, such as a leak, encountered in connection with one tire does not affect the air pressure in the other vehicle tires. Generally, most of the tire pressure control systems use a tire isolating valve interposed between the tire and the tire pressure control system and the sealing arrangement effected by the isolating valve is not severely strained because the isolating valve is not subjected to system air pressure other than when the system is operated to achieve inflation, deflation or pressure checking.

In my parent patent, an electronic-pneumatic control system is disclosed in combination with a unique tire isolating valve of the poppet type which, when manually actuated, provides a fully automated, highly accurate system for controlling the inflating, deflating and pressure checking of the vehicle's tires. One of the features of my parent patent is to conceptually utilize system pressure to initialize whatever tire pressure function the system is being instructed to do and, once initialized, utilize an orificing arrangement to sense the tire pressure which in turn controls the system pressure and valving to achieve whatever tire pressure function the system is being asked to perform. For example, when the system in my parent patent is manually placed in a discharge or tire deflation mode, system pressure is initially used to open the isolating valve. The tire pressure is then essentially discharged to atmosphere through an orifice until a predetermined lower tire pressure is accurately sensed. At that point in time, the valving system is again actuated to instantaneously close the tire isolating valve by rapidly dumping the manifold pressure to atmosphere thus bypassing the orifice sensing arrangement.

In practice, the valving and the system disclosed in my parent patent rapidly deflates the system in the tire deflation mode and satisfies most vehicular applications requiring tire deflation. However, there are applications, for example in military transport vehicles, where it is desired to have almost instantaneous deflation. This can occur when the vehicle encounters mud, water or sand and must keep its speed as high as possible. In such instances, tire deflation systems which exhaust the tire air through the system manifold or the system manifold lines will inherently produce a delay in the tire deflation mode. One can appreciate the significance of the problem by visualizing a six-wheel vehicle deflating all of the air from its six tires through one manifold line. Further compounding the problem is a definite trend over the past several years to increase tire size on such vehicle. Obviously this requires that a larger fluid mass be discharged to achieve the same deflation pressure of older vehicles using smaller tires.

Quick dump valves are well known in the general art and the use of a quick dump valve to achieve rapid deflation of a tire in a vehicular tire pressure control system has been recognized in the prior art. A typical approach is disclosed in U.S. Pat. No. 2,989,999 to Holbrook. In Holbrook, a quick dump valve is used at each tire to directly discharge the fluid in the tire to atmosphere upon command by air (which is at a higher pressure than the system pressure) being ported to the dump valve. The quick dump valve is spring biased and whenever the tire pressure drops below the compressed force of the spring, the valve shuts off to stop further tire deflation. This is workable so long as only one lower, tire deflation value is required and so long as the spring rate can be accurately correlated to the pressure sensed in that particular tire to which the valve is attached. Today, several deflation pressures are typically required with little pressure variance permitted between the vehicle's tires.

SUMMARY OF THE INVENTION

Accordingly, it is a principal object of the invention to provide a tire pressure system and/or a quick discharge valve which quickly deflates the tires on a vehicle to a predetermined pressure which in turn is directly and accurately controlled by the pressure of the fluid in the tires.

This object along with other features of the invention is achieved in a system for controlling the inflation pressure of a pneumatic tire and the like which includes a source of fluid at a first system pressure and at a second higher biasing pressure. A manifold is in fluid communication with the source of fluid and an isolating valve is adapted to be in fluid communication with the tire and with the manifold. An electronic-pneumatic valving arrangement associated with the manifold controls the flow of fluid through the manifold to the isolating valve and is also capable of porting any fluid within the manifold to atmosphere whereby the pressure within the tire may be increased, decreased or maintained at predetermined levels. A quick dump valve arrangement is adapted to be in fluid communication with the fluid source through the manifold, with the fluid in the tire and with the atmosphere. The quick dump valve is actuable to a dump position by only source fluid at the high biasing pressure to provide fluid communication directly from the tire to the atmosphere whereby the tire can be quickly deflated upon command. Specifically, the electronic-pneumatic valving arrangement is effective to cause the isolating valve to also discharge fluid from the tire to the atmosphere through the manifold while the quick dump valve is simultaneously discharging fluid directly to the atmosphere. The tires are thus being deflated in the deflation mode at a very high rate by the exhaust from both valves.

In accordance with another feature of the invention, the exhausting of a portion of the fluid in the tire through the isolating valve occurs through a deflation valve in the manifold having an orifice arrangement associated therewith and a transducer in combination with the orifice. When the transducer senses a predetermined pressure in the tire, the fluid in the manifold leaving the tire is ported from the deflation valve to an exhaust valve which rapidly depressurizes the fluid in the manifold causing both the quick dump valve and the isolating valve to immediately cycle to their off position. In this manner, the fluid pressure sensed in the tire is used to control the stopping of the fluid exhaust from the tire at an accurate preset level. Systematically, any number of predetermined deflation values can be established within the system. That is, not only can the lowest pressure level at which the valves cycle off be varied, but any number of alternative lower pressure levels can be preset. That is, the system operator control knob could be preset to any number of predetermined pressures, although only three are shown in the preferred embodiment, and when actuated, the system will rapidly exhaust to that level.

In accordance with another specific feature of the invention, a separate high pressure reservoir containing a discrete volume of fluid at the biasing pressure is provided. An electronic pulse valve arrangement within the manifold which is in fluid communication with the high pressure reservoir is provided. When the system requires a tire deflation, the pulse valves are actuated into an "on" position for a brief period of time to provide fluid communication from the high pressure reservoir to the quick dump and isolating valve arrangements through the existing system manifold lines. As indicated above, in this brief period of time, the quick dump valve arrangement is actuated to port the fluid in the tire to atmosphere and to open the isolating valve so as to provide fluid communication between the fluid in the tire and the manifold while simultaneously opening the manifold to atmosphere through the metered deflating valve. The timed opening of the pulsed valve arrangement is approximately 600 milliseconds which is sufficient to actuate the quick dump and isolating valve arrangements before the pulse is almost instantaneously dissipated by the opening of the deflating valve. Accordingly, retrofit applications are easily accomplished by simply adding the pulse valves, the quick discharge valve and the reservoir to the existing system manifold. In accordance with another aspect of the invention, that feature of the parent patent which provided a system which did not adversely affect the vehicle's air system brake pressure requirements is maintained in this invention by the use of a separate reservoir as the source of the fluid at biasing pressure, which reservoir is charged by the compressor normally supplied with the vehicle.

In accordance with another feature of the invention, the dump valve comprises a cylinder with a biasing inlet at one end in fluid communication with the source fluid and a tire inlet at the opposite end in fluid communication with the fluid in the vehicle's tire and an atmosphere outlet therebetween in fluid communication with the atmosphere. A sealed piston or spool is provided within the cylinder and positioned between the biasing inlet and the tire inlet and the piston is movable within the cylinder from a first position blocking fluid communication from the tire inlet to the atmosphere outlet and a second actuated position providing for fluid communication between the tire inlet and the atmosphere outlet. A spring biasing mechanism, in combination with the tire pressure acting on one end face of the piston, maintains the piston in its first or closed position even though fluid at system pressure may be present at the biasing inlet and acting on the opposite end face of the piston against the spring and tire pressure. When the fluid at the biasing inlet is at the higher biasing pressure, the spring biasing mechanism and tire pressure is overcome and the piston moves to its second, or open position to discharge fluid from the tire to the atmosphere. The dump valve is then maintained in its open position by a detent mechanism which exerts a mechanical force resisting movement of the piston to the closed position such that the detent mechanical force in combination with the pressure of the fluid at the biasing inlet is sufficient to overcome the biasing spring force tending to move the piston to its closed position. When the fluid pressure in the biasing inlet drops below a predetermined value (established by the transducer which actuates the quick dump valve to drop the pressure at the biasing inlet to zero) the biasing spring mechanism returns the piston to its first position to prevent further discharge of fluid from the tire to atmosphere. The detent mechanism is inoperative when the dump valve is in its closed position and the tire pressure force acting on the end face of the piston is inoperative when the dump valve is in its open position. Accordingly, a simple mechanical arrangement is utilized in a very simple valve structure which is controlled by the electronic-pneumatic mechanism of the system to accurately and quickly open and close the discharge of fluid in the tire to atmosphere. Importantly, the motion or balance of the valve is controlled by the fluid pressure at the valve's inlet.

In accordance with a more specific feature of the invention, within the housing of the quick dump valve, a second cylinder is formed having a second biasing inlet in fluid communication with the biasing inlet of the first cylinder and the second tire inlet in fluid communication with the tire inlet in the first cylinder. A poppet valve structure within the second cylinder permits fluid communication between the second biasing inlet and the second tire inlet when source fluid at system pressure or above its provided to the first biasing inlet. The poppet valve closes and prevents fluid communication when the pressure at the first biasing inlet drops below a predetermined value which is the same value established for return of the piston from the second to the first position in the quick dump valve. In this manner, both isolating and quick dump valves can be incorporated into a unitary structure using a common biasing inlet and a common tire inlet to insure instantaneous response of both valves to fluid at various predetermined pressure levels.

It is thus an object of the invention to provide a control system and valve which permits rapid discharge of the air from the vehicle's tire.

It is another object of the invention to provide a control system and valve which provides for rapid discharge of air from the vehicle's tires until a predetermined pressure level within the tire has been sensed.

It is another object of the invention to provide a quick dump valve arrangement for use in a vehicular tire pressure control system where manifold line size can be kept to a minimum.

It is yet another object of the subject invention to provide a tire pressure control system with a quick dump valve which, while requiring fluid at a high pressure to actuate, nevertheless is able to control the remaining parameters of the system at a lower system pressure, thus permitting all the valves and fluid flow components in the control system to be sized or designed only to withstand the lower system pressures.

It is another object of the invention to provide a tire pressure system where the exhausting of the tire fluid to atmosphere occurs at the individual wheels of the vehicle.

It is yet another object of the invention to provide a tire pressure control system where the tire can be rapidly exhausted to a plurality of several different, preset pressures.

Still a further object of the invention is the provision of a quick dump valve structure which is structurally compact, economical to produce, and efficient and accurate in operation.

Yet another object of the invention is to provide a quick dump valve which is actuated from off to on and on to off by fluid pressure.

DESCRIPTION OF THE DRAWINGS

These and other features and objects of the subject invention will become readily apparent to one skilled in the art upon a reading of the detailed specifications taken in conjunction with the following drawings which illustrate a preferred embodiment of the invention and which forms a part hereof and wherein:

FIG. 4 is a plan view of a preferred tire quick dump valve in accordance with the present invention and corresponds to FIG. 7 of my prior patent;

FIG. 5 is a sectional elevation view of the quick dump valve taken along line 5—5 in FIG. 4 and corresponds to FIG. 8 of my prior patent; and FIG. 5a is a detailed view of the detent mechanism shown in FIG. 5.

DESCRIPTION OF THE PREFERRED EMBODIMENTS

Figure 1:
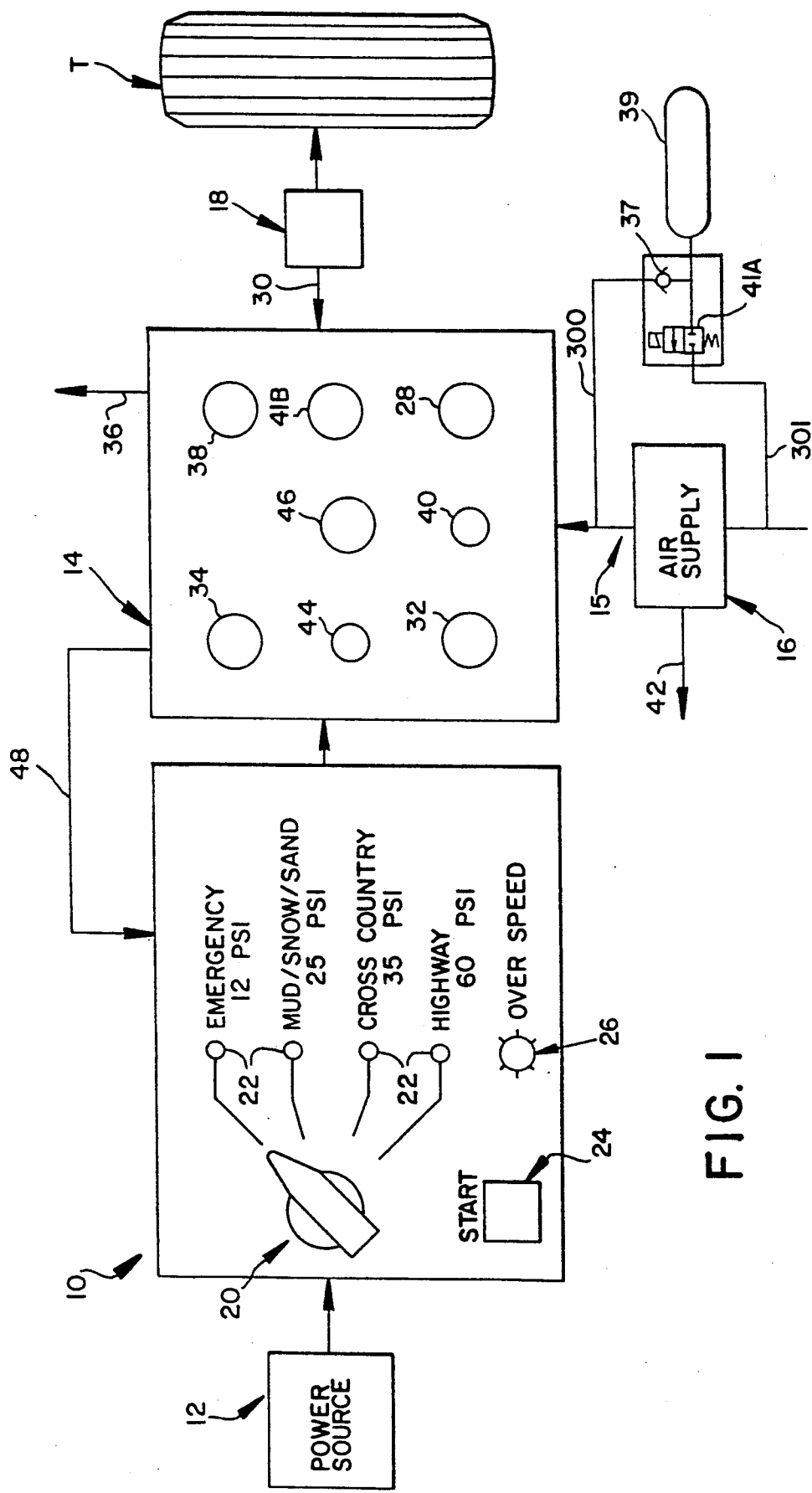
FIG. 1 is a schematic representation of the component parts of a tire pressure system in accordance with the present invention and corresponds to FIG. 1 of the parent patent.

As noted in the "Description of Drawings", the drawings in this patent correspond to the drawings in my prior patent and, except where indicated below, the reference numerals shown in the drawings correspond to the reference numerals shown in the drawings of my prior patent. Accordingly, and except as otherwise indicated, the terminology of the components, the description of the components and the operation of the components as set forth in my prior patent applies to the system and components of this invention. The description of the preferred embodiment in this patent, will describe only the different components and functions of the tire pressure system and valves of this invention. The reader is referred to my prior patent for a detailed and complete explanation of the components and functioning of the tire pressure system shown in the attached drawings.

Figure 2:
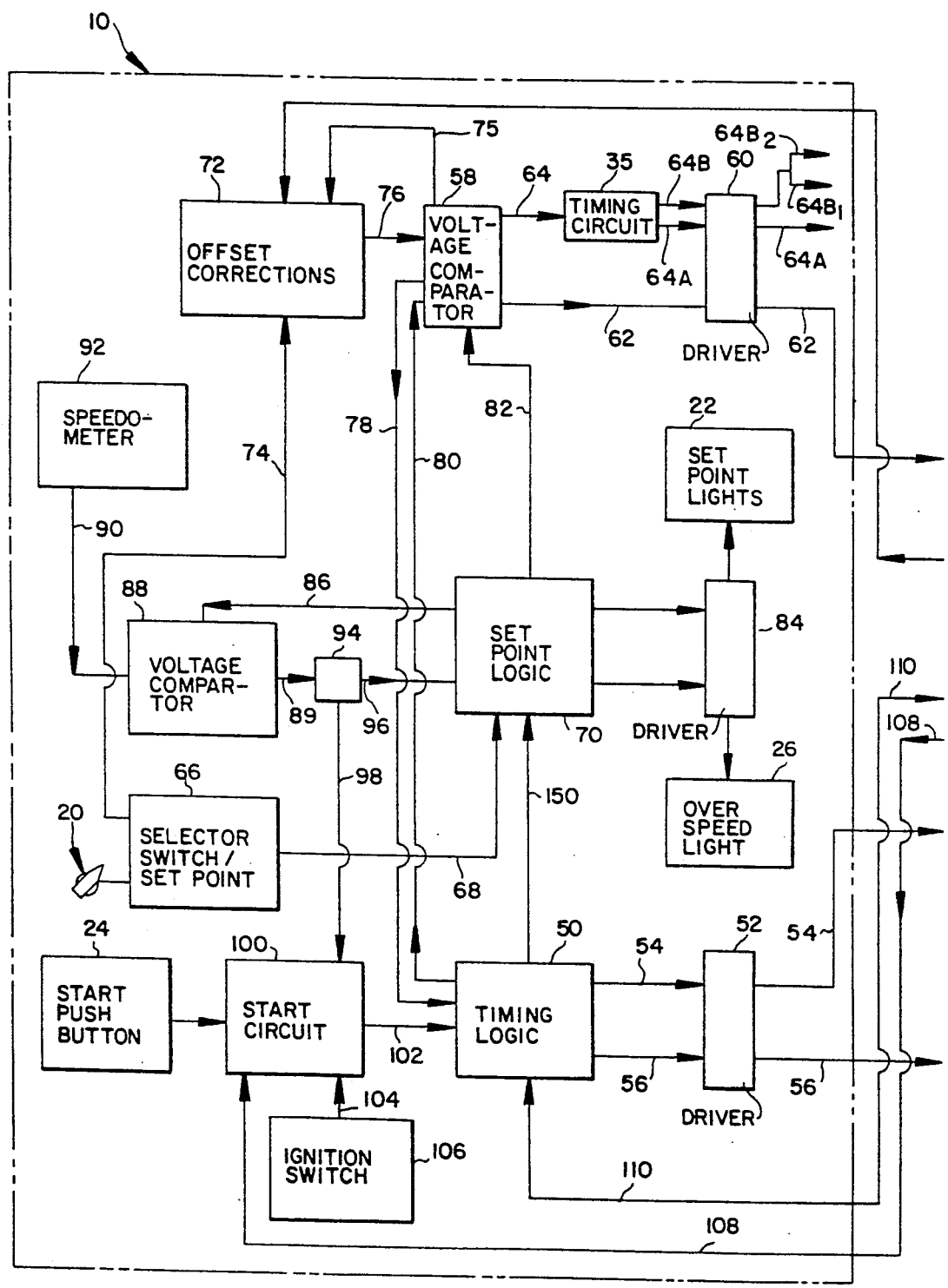
FIGS. 2 and 2a are together a schematic representation of the component parts of the electronic and pneumatic control modules of the apparatus and correspond to FIGS. 2 and 2a of my prior patent.

Referring now in greater detail to the drawings wherein the showings are for the purpose of illustrating the preferred embodiment of the invention only and not for the purpose of limiting the same, FIGS. 1 and 2 illustrate schematically the overall tire pressure system of the present invention. As noted, FIG. 1 is identical to FIG. 1 of my prior patent except that a high biasing pressure reservoir 39 is added to the air supply 16. This is accomplished by a charging conduit 300 in fluid communication with air supply conduit 15 at one end and in fluid communication with biasing pressure reservoir 39 at its other end through a one-way check valve 37. As described in my prior patent, it is contemplated that air supply 16 is generated from the compressor on the motor vehicle which supplies vehicular air pressure principally for operation of the vehicle's brakes. Normally, regulators are used in air supply 16 to maintain a vehicular system pressure of about 70-80 psi. The compressor, however, can and does develop a pressure of about 120-140 psi prior to entering the regulators and it is this pressure which is used to charge reservoir 39 through charging conduit 300. Thus, appropriate regulators, not shown, within air supply 16, function to fully charge biasing pressure reservoir 39 to approximately 120 psi in a known manner. Fluid in high pressure reservoir 39 is then discharged through a discharging conduit 301 when a first pulse valve 41a is actuated. Discharge conduit 301 in turn is in fluid communication with air supply line 15 which in turn is in fluid communication with the manifold 14. Manifold 14 is identical to that disclosed in my parent patent with the exception of the addition of a second pulse valve 41b. Thus, FIG. 1 of the present invention differs from my prior patent in the addition of a discrete volume of high pressure fluid in biasing pressure reservoir 39 which is plumbed into the same manifold 14 as disclosed in my prior patent except for the addition in manifold 14 of a second pulse valve 41b. The dimensions and sizes of manifold 14 and the manifold conduits are the same as that used in my prior patent. Thus, the system has been modified to carry a highly pressurized source of fluid without dimensionally increasing the size of the standard components.

Figure 2A:
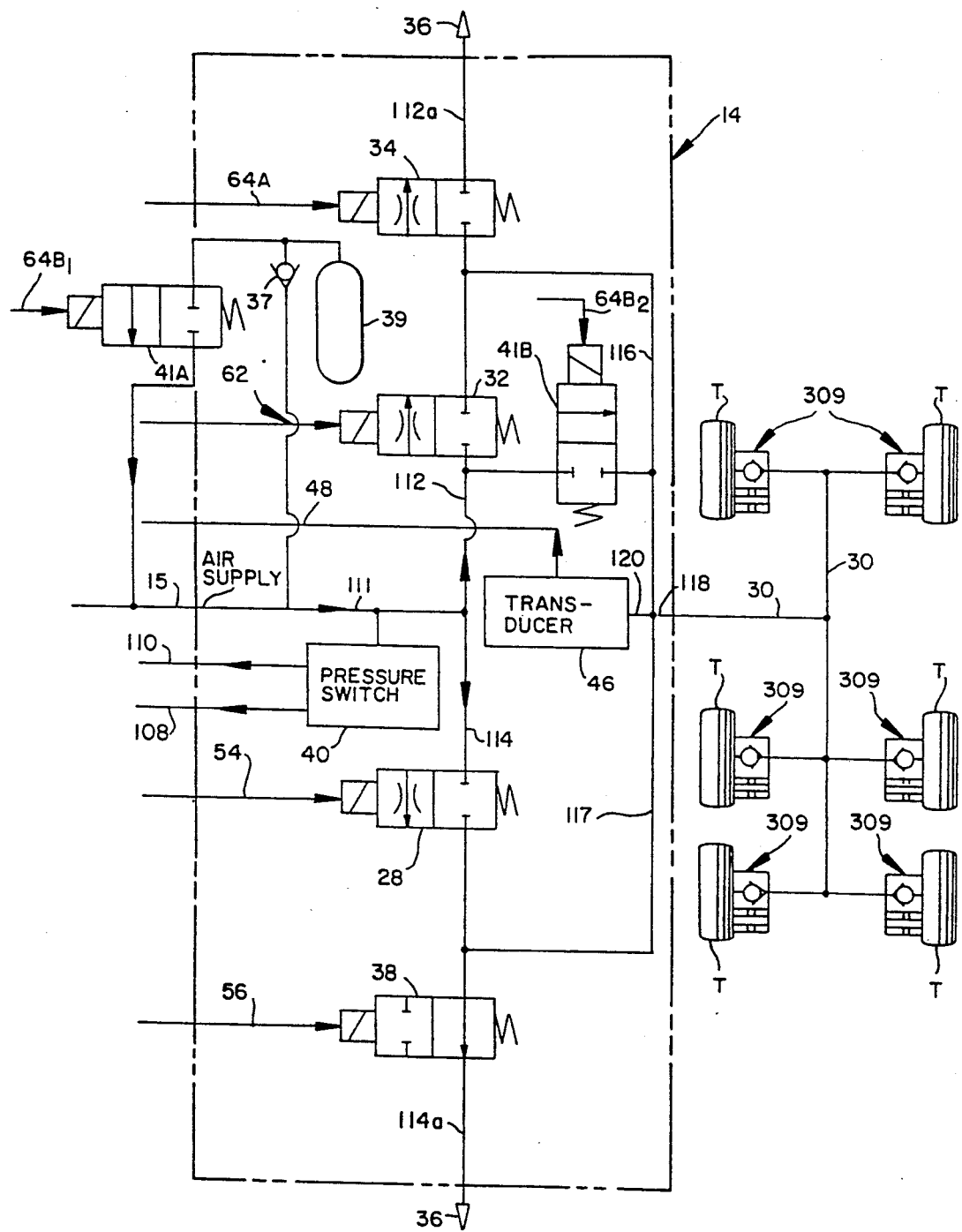

Referring next to FIG. 2, it will be noted that the drawing has been changed to include a timing circuit 35 which has been interposed between voltage comparator 58 and its driver 60. Timing circuit 35 could comprise any conventional timing circuit arrangement generating initially a first output 64b and then, after a short period of time in the neighborhood of about 600 milliseconds, generates a second output 64a while terminating first output 64b. A binary ripple counter CD4060 available from RCA Corporation could function for such a purpose. Driver 60 is unchanged from my prior patent and first output 64b is branched into two outputs 64b1 and 64b2 actuating, respectively, first pulse valve 41a and second pulse valve 41b. After the discrete time period of about 600 milliseconds, timing circuit 35 generates second output 64a while terminating first output 64b which is inputted into driver 60 and outputted therefrom to orificed standard deflation valve 34. Output 62 from comparator 58 is unchanged and actuates tire inflating valve 32 in the manner described in my parent patent. FIG. 2a shows the integration of pulse valves 41b, 41a and the high pressure biasing reservoir 39 into the electronic-pneumatic valving arrangement. Deleted from FIG. 2a for simplifying purposes is pressure responsive relief valve 44 which functions to open the system to atmosphere through vent 36 at a predetermined high pressure above which the tires are not to be inflated. The high pressure relief valve can be included in the system of the present invention by simply making the valve into a two position solenoid operated valve and integrating its operation into the electronic schematic shown so that the valve is cycled into its "off" position when pulse valves 41a, 41b are actuated and is in its "on" high pressure sensing position whenever the valves are not actuated. For drawing simplicity, high pressure relief valve 44 is not shown.

Referring now to FIGS. 4 and 5, FIG. 4 shows a plan view of a combination quick dump-isolating valve 309 similar to FIG. 7 of my parent patent. As best shown in FIG. 5, combination quick dump-isolating valve 309 has a valve housing 310 which incorporates tire isolating valve 18 and dump valve 312 of the present invention. More specifically, valve housing 310 has a first cylindrical chamber 314 containing the mechanism of dump valve 312 and a second cylindrical chamber 315 containing the poppet valve mechanism of tire isolation valve 18. The reader is referred to the parent patent for a detailed explanation of the operation of the poppet valve mechanism of isolating valve 18. Combination quick dump-isolating valve 309 has a biasing pressure inlet 317 adapted to be in communication with the fluid pressure source through the manifold 14 and a tire pressure inlet 318 adapted to be in fluid communication with the fluid in the tire T. Biasing pressure inlet 317 has a first biasing pressure inlet conduit 320 in fluid communication with one end of first cylindrical chamber 314 and a second biasing pressure inlet conduit 321 in fluid communication with one end of second cylindrical chamber 315. There is no pressure drop through the conduits 320, 321 and the pressure at first inlet conduit 320 is identical to the pressure at second inlet conduit 321. Similarly, tire pressure inlet 318 has a first tire pressure inlet conduit 323 in fluid communication with the opposite end of first cylindrical chamber 314 and a second tire pressure inlet conduit 324 in fluid communication with the opposite end of second cylindrical chamber 315. There is no pressure droop in either tire pressure conduit inlet 323, 324 and the pressure therein is identical to that existing in the tire T to which combination quick dump-isolating valve 309 is secured.

Axially spaced between first biasing pressure inlet conduit 320 and first tire pressure inlet conduit 323 is a large atmosphere outlet 326 in fluid communication with first cylindrical chamber 314. Disposed within first cylindrical chamber 314 is a quick dump piston or spool 328 having a first axial end face 330 in fluid communication with first biasing pressure inlet conduit 320 and, at its opposite end, a second axial end face 331 in fluid communication with first tire pressure inlet conduit 323. Piston 328 is axially movable in first cylindrical chamber 314, in part, by fluid under pressure acting on either first axial end face 330 from biasing pressure inlet 317 or tire fluid under pressure acting on second axial end face 331 through tire pressure inlet 318.

A biasing spring 333 engaging at one of its ends second axial end face 331 and at its other end, a shoulder 334 formed in first cylindrical chamber 314 provides a biasing force tending to move piston 328 towards the left as seen in FIG. 5 or in the "off" position of dump valve 312. As shown in FIG. 5, piston 328 is hollowed at its second axial end face 331 and has a plurality of circumferentially spaced, radially extending openings 336 drilled through piston 328. The interior of openings 336 are in fluid communication with tire fluid through tire pressure inlet 318 at all times. A pair of atmosphere O-ring seals 338, 339 straddle atmosphere outlet 326 to prevent the fluid from tire T communicating with atmosphere outlet 326 when dump valve 312 is at its "off" position. Piston 328 takes the shape of a solid cylindrical plug at its portion adjacent first axial end face 330 and an annular groove 340 is formed in piston 328 adjacent first axial end face 330.

As best shown in FIG. 5a, a detent mechanism 341 operates in conjunction with annular groove 340. Detent mechanism 341 includes a threaded hole 342 drilled into valve housing 310 which is in fluid communication with first cylindrical chamber 314 adjacent first biasing pressure inlet conduit 320. Inserted into threaded hole 342 is a ball detent 343 having a radius approximately equal to that of annular groove 340. Urging ball detent 343 into contact with piston 328 is detent spring 344, the compressive force of which is adjustable by slotted screw 345. Accordingly, dump valve 312 is adjusted by adjusting the position of slotted screw 345 in threaded hole 342 of detent mechanism 341. A pair of detent O-ring seals 350, 351 straddle detent mechanism 341 to prevent leakage of fluid to threaded hole 352. It is preferred that a pair of atmosphere O-ring seals 338, 339 and a pair of detent O-ring seals 350, 351 be used instead of a three O-ring seal arrangement. Using 4 O-ring seals as shown provide a better balanced or more responsive valve instead of a three O-ring seal arrangement by avoiding any possibility of a differential pressure acting on the intermediate seal.

In the unactuated or "off" position of dump valve 312 as shown in FIG. 5, detent mechanism 341 is not in contact with annular groove 340 and is thus disengaged. Further, openings 336 are not in fluid communication with atmosphere outlet 326. Thus, there is a system pressure force from biasing pressure inlet 317 acting on first axial end face 330 of piston 328 tending to move piston 328 towards it unactuated position or towards the right as viewed in FIG. 5. This force, whatever it might be, is resisted by the force of the fluid from tire T acting on second axial end face 331 which acts to move piston 328 towards the unactuated position or the left as viewed in FIG. 5. To this tire pressure force is added the mechanical force of biasing spring 333 which is always acting to shift piston 328 towards its unactuated position. When the fluid pressure at biasing pressure inlet 317 becomes great enough to overcome the force of biasing spring 333 and the force developed by fluid from tire T, piston 328 will shift towards the right as viewed in FIG. 5 to its actuated position. (As already indicated, fluid at system pressure, i.e. 70–80 psi will, will not be sufficient to shift piston 328, but fluid at the biasing pressure, i.e. 110–120 psi, will move piston 328.) In the actuated position of dump valve 312, ball detent 343 engages annular groove 340 and openings 336 are in fluid communication with atmosphere outlet 326. Thus, in the open or actuated position of dump valve 312, the biasing force developed by the tire pressure fluid is no longer operative against second axial end face 331 to shift piston 328 towards its unactuated position. The only force acting to shift piston 328 towards its off position is biasing spring 333 and the force of biasing spring 333 is resisted by first, the mechanical force exerted by ball detent 343 engaged in annular groove 340 and which must be dislodged before piston 328 can return to its "off" position and secondly, the force developed by system pressure at biasing pressure inlet 317 acting on first axial end face 330. When the biasing pressure fluid force drops below a predetermined level, the mechanical force of biasing spring 333 will overcome the mechanical force exerted by detent mechanism 341 and shift piston 328 towards its unactuated position. As soon as openings 336 clear atmosphere outlet 326, the force from the fluid at tire pressure will add to the force of biasing spring 333 to insure quick closure of piston 328 to its actuated position. It should be noted then that detent mechanism 341 is providing an instantaneous "on/off" open/closure action to quick dump valve 312. That is, system pressure is used to actuate the valve from its "off" to its "on" position at which time detent mechanism 341 is instantaneously engaged to lock dump valve 312 into its "on" position. Simultaneously, when the biasing pressure fluid drops to a predetermined value (i.e. when manifold pressure drops to zero as it is ported through exhaust valve 38) detent mechanism 341 is instantaneously disengaged and quick dump valve 312 rapidly and firmly moves to its unactuated or "off" position. Thus, a "snap-action" operation is obtained. Additionally, a counterbalancing mechanical spring arrangement is utilized to permit quick dump valve 312 to be sensitive to operation only from the pressure of the fluid developed by the system.

OPERATION

The operation of the system will now be explained only with respect to its discharge mode. The reader is referred to the parent patent for operation of the system for pressure checking and inflation since the system has not been changed with respect to such functions. In the discharge mode, the tires are at some predetermined pressure, i.e. highway at 60 psi, cross country at 35 psi or mud/snow/sand at 25 psi and the vehicular operator actuates the system from electronic control module 10 by manually moving pressure selector component 20 to the desired deflation level and depressing start button 24. For definitional purposes, the numeral 14 means the manifold and includes all the valving and associated manifold conduits needed to operate the system. The electronic module 10 in combination with manifold 14 comprises the electronic-pneumatic valving arrangement necessary to operate the system from an external air supply source 16 which includes high pressure reservoir 39. Within manifold 14, there are a number of manifold lines but there is one principal manifold line designated by numerals 118, 116 and 117 which remains in fluid communication with combination quick dump-isolating valve 309.

Figure 3:
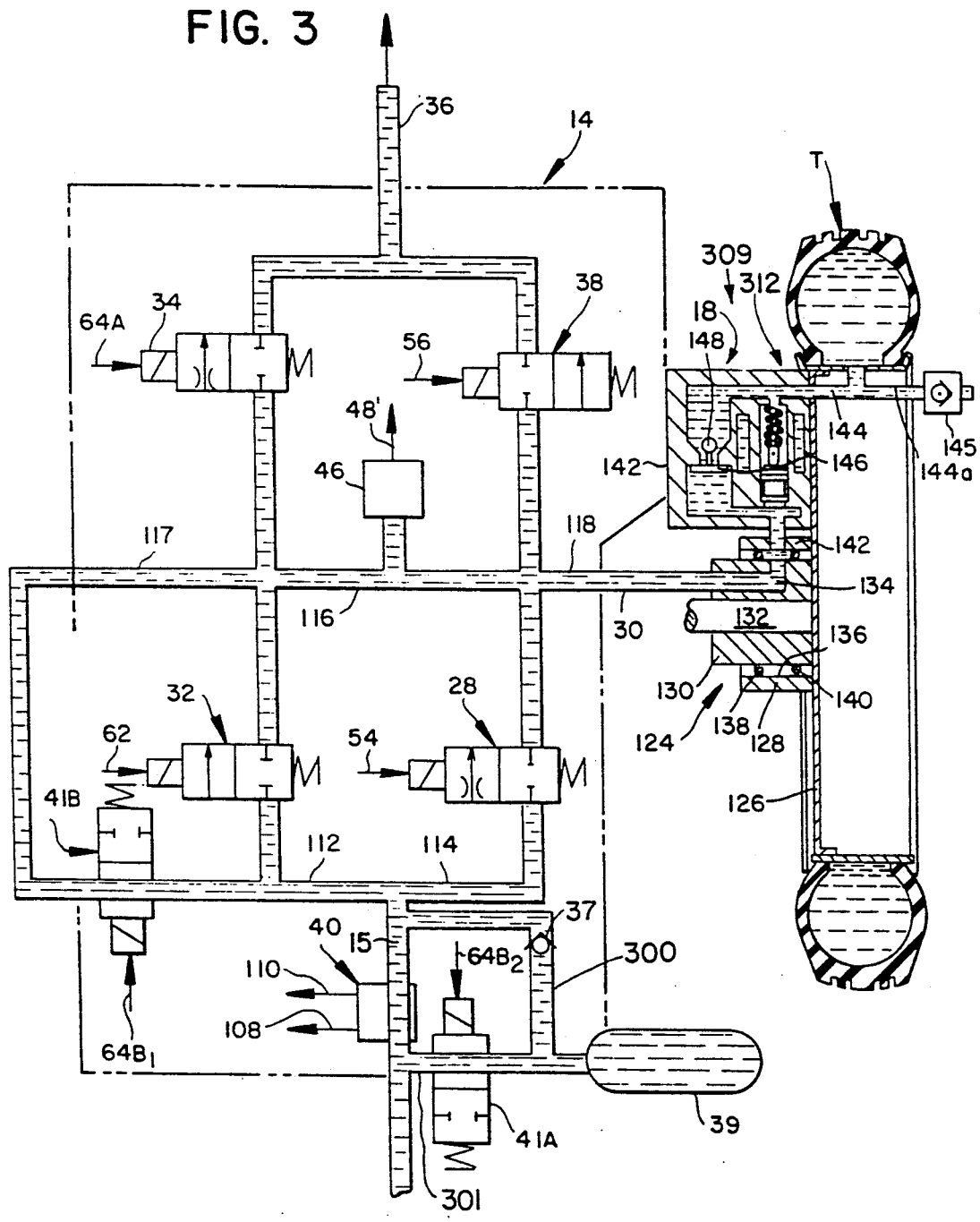
FIG. 3 is a schematic illustration of the pneumatic control module and a vehicle tire showing the position of the component parts thereof at the beginning of a tire deflating operation and corresponds generally to FIGS. 3 through 6 of my prior patent.

As best shown in FIG. 3, when the operator actuates the deflation mode of the system, comparator 58 generates a signal 64 which is timed through timing circuit 35 to generate, for a discrete time of about 600 milliseconds, a signal 64b which is split into signals 64b1 and 64b2 to simultaneously actuate pulse valves 41a and 41b. At this time, fluid from high pressure reservoir 39 is discharged through first pulse valve 41a into air supply line 15 and thence through second pulse valve 41b into main conduit 117, 116 and 118 and shocks dump valve 312 isolating valve 309 into their open positions. At this time, exhaust valve 38, tire inflating valve 32 and preliminary control valve 28 are closed. Also shown closed is standard deflating valve 34. Thus, for a very short period of time, 600 milliseconds or so, the system is sealed from atmosphere and is shocked into an actuating position. At the end of the 600 millisecond time, timing circuit 35 generates signal 64a which actuates standard deflating valve 34 into its orificed "on" position which immediately and almost instantaneously in conjunction with the isolation valve 309 dissipates the shock the system received from high pressure biasing source reservoir 39 so that the other valves in the system and the manifold lines do not need to be increased in size or otherwise strengthened because of the high pressure from reservoir 39. At this point in time, fluid from each tire T is rapidly escaping to atmosphere through atmosphere outlet 326 of dump valve 312 and simultaneously, fluid is also escaping, at a controlled rate, from tire isolating valve 18 through the orifice of standard deflation valve 34 to atmosphere. Transducer 46 is now sensing tire pressure by pressure within manifold 14 to actuate the system in the same manner as described in my prior patent. Specifically, the flow of fluid from tire T through standard deflating valve 34 is creating a back pressure continuously monitored by transducer 46 and correlated through the electronic circuitry to the tire pressure. When the tire pressure drops to whatever pressure level is dictated by controller 20, the system will automatically switch tire deflating valve 34 to its "off" position and actuate exhaust valve 38 to quickly dump the fluid in the manifold to atmosphere through conduit 36. This will drop the pressure of the fluid in biasing pressure inlet 317 almost immediately to zero and force tire isolating valve 18 to its closed position and simultaneously therewith close dump valve 312 in the manner described above.

The valving of the present invention does not affect the operation of the tire pressure system during the inflation mode or the pressure checking mode because first and second pulse valves 41a, 41b are actuated only in the discharge mode. Thus, in all other instances, the pressure delivered to combination quick dump-isolating valve 309 does not exceed the normal system pressure of about 70–80 psi and this pressure, while sufficient to operate tire isolating valve 18 as described in my parent patent, is insufficient to actuate dump valve 312.

The invention has been described with reference to a preferred embodiment. Obviously, alterations and modifications will occur to others skilled in the art upon reading and understanding the specifications. For example, dump valve 312 has been shown to be always engaged whenever a discharge mode is required. The system can be easily modified so that pulse valves 41a, 41b will only be actuated when the operator places the tire pressure system into the emergency mode and the other modes could be utilized in the manner described in the parent patent which will permit a somewhat rapid but more slower deflation of the tires than that disclosed herein. Also, the term "fluid" has been used throughout with reference to a description of a pneumatic system because the concepts disclosed herein could be used in any gaseous system and, conceptually, in systems where the tires are filled with liquid under pressure, in which instance, the system would be modified to include reservoirs and return lines. It is my intention to include all such modifications and alterations insofar as they come within the scope of the present invention.

It is thus the essence of my invention to provide a vehicular tire pressure system which utilizes system and tire pressure to rapidly exhaust tire pressure in a very accurate and controllable manner.

I claim:

1. A dump valve for use in a vehicular, tire pressure control system having a first source of fluid at a system pressure, a second source of fluid at a biasing pressure, and control means including means for selectively communicating said fluid sources for controlling the inflation and deflation of the vehicular tires, said dump valve comprising:
   a) a housing having a cylinder therein, said cylinder having a biasing inlet at one end thereof adapted to be in fluid communication with said sources of fluid, a tire inlet at the opposite end in constant communication with the fluid in the vehicle's tire, and an atmosphere outlet between said inlets adapted to be in fluid communication with atmosphere;
   b) a sealed piston within said cylinder and movable from a first position blocking fluid communication from said tire inlet to said atmosphere outlet and a second position providing fluid communication between said tire inlet and said atmosphere outlet, said piston having a first face surface at one end adjacent said biasing inlet wherein fluid under pressure at said biasing inlet develops a force tending to move said piston towards said second position, said piston having a second face surface adjacent said tire inlet whereby fluid under pressure in said tire develops a force when said piston is at said first position which tends to maintain said piston at said first position;
   c) spring biasing means acting on said second face surface to develop a mechanical force urging said piston towards said first position, said spring biasing force in combination with the pressure of said tire fluid acting on said second surface sufficient to prevent movement of said piston to said second position when the pressure of fluid at said biasing inlet is equal to or less than said system pressure while insufficient to prevent movement of said piston to said second position when the pressure of fluid at said biasing inlet is at said biasing pressure; and
   d) detent means actuated when said piston is at said second position to exert a mechanical force resisting movement of said piston to said first position, said detent mechanical force in combination with fluid at said biasing inlet above a predetermined level sufficient to overcome said spring biasing means and maintain said piston at said second position whereby said rapid exhaust of said tire fluid is ensured.

2. The dump valve of claim 1 further including said spring biasing means sufficient to move said piston from said second position to said first position when the pressure of said fluid at said biasing inlet drops below a predetermined value whereby said closure of said dump valve is ensured.

3. The dump valve of claim 2 further including
   said control means including means to exhaust fluid at system pressure to atmosphere;
   a second cylinder within said housing said second cylinder having a second biasing inlet in fluid communication with said biasing inlet of said first cylinder and a second tire inlet in fluid communication with said tire inlet in said first cylinder;
   poppet valve means within sad second cylinder providing fluid communication between said second biasing inlet and said second tire inlet when fluid at system pressure is provided at said biasing inlet, said poppet valve means preventing fluid communication between said second tire inlet and said second biasing inlet when said fluid at said system pressure has been exhausted to atmosphere by said control means, whereby said piston moves from said second to said first position.

4. The dump valve of claim 3 wherein said control means is actuated to exhaust said fluid at system pressure to atmosphere when the pressure of said system fluid at said biasing inlets drops below any one of several predetermined values.

5. The dump valve of claim 4 wherein said system pressure is not greater than about 80 psi and said biasing pressure is greater than said system pressure but not more than 140 psi.

6. A dump valve for use in a vehicle tire pressure control system having pressurized air source means and control means including means to control the pressure of air in said system between said source and a tire of the vehicle during inflation and deflation of said tire, said dump valve comprising:
   a) a housing having chamber means therein, said chamber means having a first inlet adapted to be in air flow communication with said air source means and a second inlet in constant air flow communication with air under pressure in said tire, said chamber means further including exhaust port means between said first and second inlets adapted to be in air flow communication with atmosphere;
   b) pneumatically displaceable valve element means in said chamber means and movable from a first position closing said exhaust port means to a second position opening said exhaust port means to provide an air flow path for air under pressure in said tire from said second inlet to atmosphere through said exhaust port means, said valve element means having first surface means exposed to air under pressure at said first inlet so as to develop a force tending to move said valve element means towards said second position, said valve element means having second surface means exposed to said air under pressure in said tire at said second inlet so as to develop a force tending to move said valve element means toward said first position;
   c) spring biasing means acting on said second surface means together with said tire air pressure to bias said valve element means towards said first position,
   d) mechanical detent means interengaging said valve element means and said housing means when said valve element means is in said second position to exert a mechanical force releaseably holding said valve element means in said second position; and (e) said valve element means being displaced from said first position to said second position by air at a first pressure at said first inlet acting against said first surface means and being held in said second position during tire deflation by said detent means and by air at a second pressure less than said first pressure acting against said first surface means, said control means including means to exhaust air from said first inlet to atmosphere, and said valve element means being displaced from said second to said first position by said biasing spring means and said tire pressure acting against said second end face means when said first inlet is exhausted to atmosphere.

* * * * *